United States Patent [19]
Tokunaga

[11] 4,122,516
[45] Oct. 24, 1978

[54] INVERTER CONTROL APPARATUS
[75] Inventor: Norikazu Tokunaga, Hitachi, Japan
[73] Assignee: Hitachi, Ltd., Japan
[21] Appl. No.: 811,259
[22] Filed: Jun. 29, 1977
[30] Foreign Application Priority Data Jul. 14, 1976 [JP] Japan .................................. 51-82955

[51] Int. Cl.² ............................................. H02M 7/00
[52] U.S. Cl. ......................................... 363/79; 307/64
[58] Field of Search ...................... 307/64, 66; 363/79, 363/80

[56] References Cited

U.S. PATENT DOCUMENTS

| | | | |
|---|---|---|---|
| 3,293,498 | 12/1966 | Baude ................................. | 307/66 X |
| 3,745,365 | 7/1973 | Spreadbury et al. ................... | 307/64 |
| 3,986,098 | 10/1976 | Tamii et al. ........................ | 307/64 X |

Primary Examiner—William M. Shoop
Attorney, Agent, or Firm—Craig & Antonelli

[57] ABSTRACT

An apparatus for controlling the operation of an inverter which converts DC power obtained by rectification of a received AC power or DC power received from a battery which is alternatively actuated in case of an AC power supply failure or the like, into AC power. The inverter control apparatus includes a first control means which detects the output voltage of the inverter to thereby control the operation of the inverter in accordance with the detected value of the inverter output voltage. The inverter control apparatus further includes a detector for detecting variations in the input voltage of the inverter and second control means for controlling the width of the firing angle which is controlled by the first control means, in accordance with the detected value of the inverter input voltage variations, so that variations in the output voltage of the inverter may be suppressed even in the case of occurrence of variations in the input voltage of the inverter.

21 Claims, 9 Drawing Figures

INVERTER CONTROL APPARATUS

BACKGROUND OF THE INVENTION

This invention relates to an inverter control apparatus, or more in particular to an inverter control apparatus most suitably used for an uninterruptible power system.

Such an inverter that is connected with a DC power supply which rectifies a received AC power to produce DC power and converts the DC power supplied by the DC power supply into stable AC power is well known as disclosed, for example, in U.S. Pat. No. 3,718,853. It is common practice to provide such an inverter with control means for detecting the output voltage of the inverter to control it at a desired value. Further, what is called an uninterruptible power system is also known, as disclosed for example in U.S. Pat. No. 3,714,452, in which, with an additional DC power supply adapted to be actuated to supply DC power to the inverter immediately upon the occurrence of such a fault of the main DC power supply which interrupts the production of the DC output thereof, thus interruption of the output of the inverter may be prevented. Such an additional DC power supply includes a battery and sometimes means for charging the battery. This uninterruptible power system has the disadvantage that the input voltage of the inverter undergoes a change resulting in a variation in the output voltage of the inverter as described in detail later, due to the voltage difference occurring between the two DC power supplies when the two DC power supplies are switched. As means for dampening the variation in the output voltage of the inverter in such a case, a method was suggested in which a thyristor rectifier is used as the main DC power supply and the rectified voltage is regulated in accordance with the output voltage of the additional DC power supply with the battery. The disadvantages of this method are a complicated configuration and resulting high cost of the apparatus.

SUMMARY OF THE INVENTION

Accordingly, it is an object of the present invention to obviate the above-mentioned disadvantages of the conventional apparatus and provide an inverter control apparatus in which variations in the output voltage of the inverter may be suppressed in spite of the variations in the input voltage thereof so as to keep the output voltage substantially constant.

Other objects, features and advantages of the present invention will be made apparent by the description of preferred embodiments taken below in conjunction with the accompanying drawings.

DESCRIPTION OF THE PRIOR ART

Prior to the explanation of the present invention, conventional apparatus will be described to facilitate the understanding of the invention.

Figure 1:
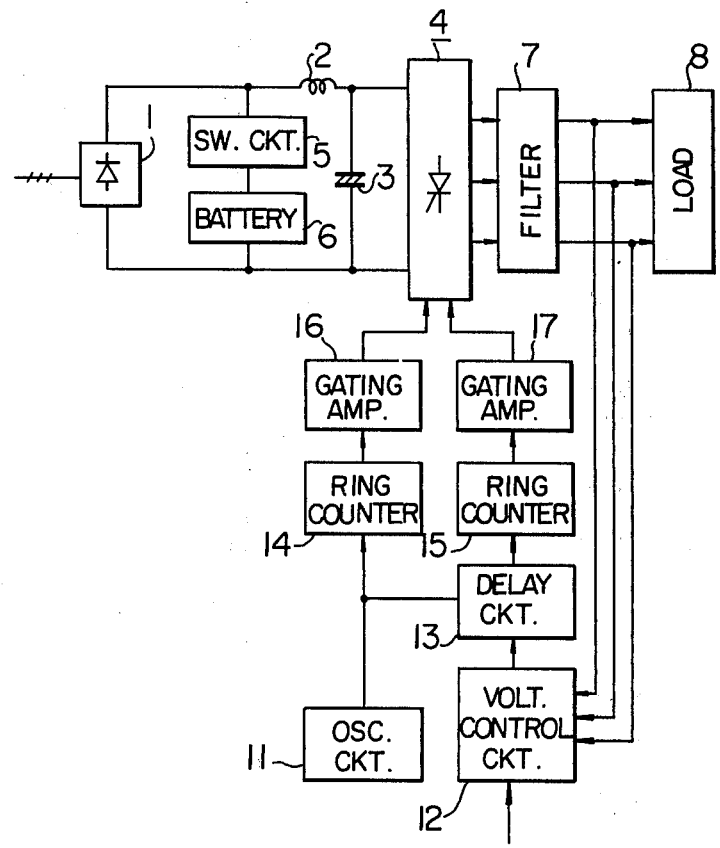
FIG. 1 is a block diagram showing a conventional inverter control apparatus.

A block diagram of a conventional uninterruptible power system is shown in FIG. 1.

Referring to FIG. 1, numeral 1 shows a rectifier for converting a received AC power into DC power. Numerals 2 and 3 show a reactor or inductor and a capacitor respectively, which cooperate to make up a filter circuit for removing the pulsating current from the DC power obtained from the rectifier 1. The resulting DC power is converted into stable AC power by an inverter 4.

In the case of failure of the power supply from which DC power is received, a normally-open switch 5 is immediately actuated to close, thereby supplying DC power to the inverter 4 from the battery 6.

The AC power, for example three-phase AC power, produced by the inverter 4 is improved in waveform by removing higher harmonics, etc. by means of a filter 7, and supplied to a load 8.

The firing of the inverter 4 is controlled for production of an output with an AC waveform by a thyristor firing control circuit including an oscillator 11, a delay circuit 13, ring counters 14, 15, and gate amplifiers 16, 17. This thyristor firing control circuit is essential to a thyristor inverter apparatus. Further, there is provided a voltage control circuit 12 for controlling the output voltage of the inverter.

The oscillator 11 is for determining the operating frequency of the inverter 4 and supplies signals to both the delay circuit 13 and the ring counter 14. The delay circuit 13 is provided for the purpose of delaying the pulse phase of the output of the oscillator 11. The ring counters 14 and 15 distribute the pulses applied thereto from the oscillator 11 and the delay circuit 13. The distributed signals are supplied to the gate amplifiers 16 and 17, which respectively form firing signals for the inverter 4.

Figure 2:
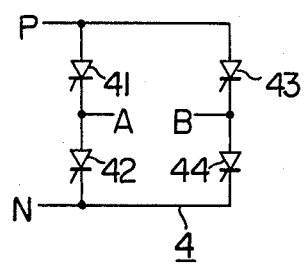
FIG. 2 is a diagram showing the main circuit of a unit inverter.

FIG. 2 is a circuit diagram showing a unit inverter which constitutes the inverter 4. Between a pair of input terminals P and N, a set of thyristors 41 and 42 connected in series in the same polarity are connected in parallel with another set of thyristors 43 and 44 also connected in series in the same polarity. (In FIG. 2, the commutation circuit for each thyristor is not shown.)

Figure 3:
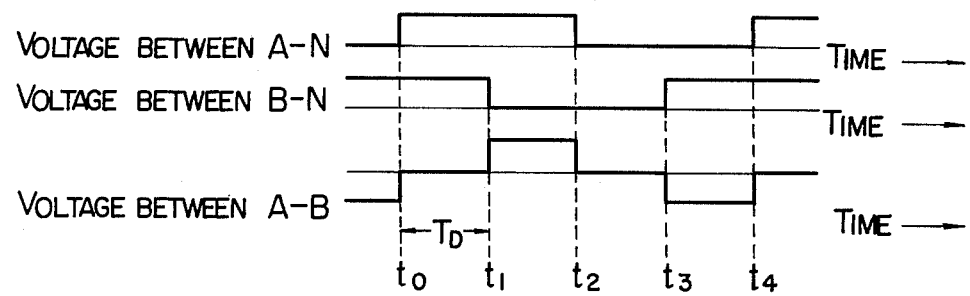
FIG. 3 is a waveform diagram for explaining the operation of the unit inverter shown in FIG. 2.

A DC input is supplied between the terminals P and N and the thyristors 41 and 42 are alternately and alternatively turned on and off on one hand, and the thyristors 44 and 43 are also alternately and alternatively turned on and off on the other hand. The on-off operation of the thyristors 44 and 43 is behind that of the thyristors 41 and 42 in phase by the delay time $T_D$ established by the delay circuit 13. In other words, as obvious from FIG. 3 showing the voltage waveforms produced at various parts of the unit inverter of FIG. 2, the thyristors 41 and 42 are in an on-state and an off-state respectively during the period from $t_0$ to $t_2$; while the thyristors 41 and 42 are in an off-state and an on-state respectively during the period from $t_2$ to $t_4$. This on-off condition alternatively alternates. The thyristors 44 and 43, on the other hand, are turned on and off alternatively and alternately with the phase retarded by the time $T_D$ and with the same period with the on-off operation of the thyristors 41 and 42. Thus, during the period from $t_1$ to $t_3$ which is equal to the period from $t_0$ to $t_2$, the thyristors 43 and 44 are in an off-state and an on-state respectively, followed by the next period during which the thyristors 43 and 44 are in an on-state and an off-state respectively. This on-off operation is alternately and alternatively repeated. It will be easily understood from the drawings that the delay time $T_D$ must be shorter than one repetition period of the on-off operation. In this way, the output voltage between the output terminals A and B is taken out in the form of an alternating current waveform. The output voltage of the inverter is controlled by adjusting the delay time $T_D$ in accordance with a command issued by the voltage control circuit 12 to the delay circuit 13.

The inverter 4 shown in FIG. 1 may include a plurality of such unit inverters as described above so as to improve the waveform of the output voltage. In order to produce a poly-phase AC output, the number of unit inverters may be equal to or may be several times the number of the phases required.

Under normal conditions DC power obtained from the rectifier 1 is supplied to the inverter 4, while in the case of a fault such as a defect in the supply of received AC power, DC power is supplied from the battery 6. The inverter 4 converts the thus supplied DC power into stable AC power which is then supplied to the load 8.

When the rectifier 1 and the battery 2 are switched therebetween, the input voltage of the inverter 4 is subjected to a change due to a potential difference therebetween. Since the voltage control of the inverter 4 is effected by varying the delay time $T_D$ as mentioned above, the output voltage of the inverter 4 can not be controlled before time point $t_3$ even if the inverter input voltage undergoes a change between time points $t_1$ and $t_2$, as shown in FIG. 3. Further, the general fact that the voltage control circuit 12 has a time delay in response leads to the disadvantage that variations in the input voltage of the inverter 4 cause corresponding variations in the output voltage of the same.

In such a case, a conceivable counter-measure may be to employ; a thyristor rectifier as the rectifier 1 and the rectified voltage is controlled in accordance with the voltage across the battery 2 so that the variations in the output voltage of the inverter 4 are suppressed. Such a construction, however, complicates and increases the cost of the apparatus.

DETAILED DESCRIPTION OF THE PREFERRED EMBODIMENTS

Figure 4:
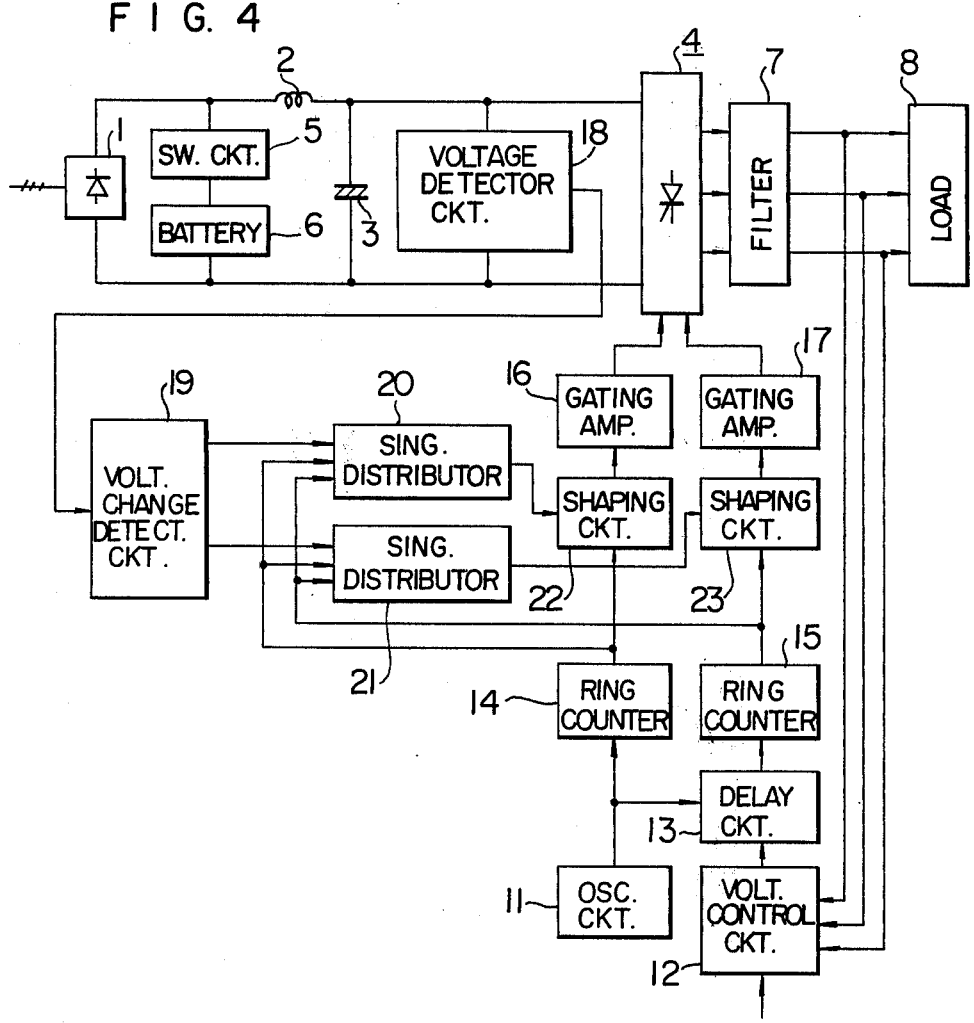
FIG. 4 is a block diagram showing an embodiment of the present invention.

A block diagram of an embodiment of the present invention is shown in FIG. 4. In addition to the component elements included in the conventional apparatus shown in FIG. 1, the embodiment under consideration includes a voltage detector circuit 18, a voltage-variation detector circuit 19, signal distributor circuits 20, 21, and waveform shaping circuits 22, 23. The other component elements analogous to those shown in FIG. 1 are denoted by like reference numerals.

The voltage detector circuit 18 detects an input voltage of the inverter 4. On the basis of this detection signal, the voltage variation detector circuit 19 produces a detection output in accordance with the instantaneous change or derivative of input voltage with respect to time $dv/dt$ of the inverter 4 (hereinafter referred to as input voltage variation rate). In response to the value of this detection output, the signal distributor circuits 20 and 21 control the gating pulse width. The respective input sections of the signal distributor circuits 20 and 21 are impressed with output signals from the ring counters 14 and 15.

Further, the waveform shaping circuits 22 and 23 are used to form gating pulses in accordance with the signals produced by the ring counters 14, 15 and the signal distributor circuits 20, 21.

When the voltage difference between the rectifier 1 and the battery 2 is small, the input voltage variation rate of the inverter 4 is also small at the time of switching therebetween. As long as this input voltage variation rate is within a predetermined value, no output is produced from the voltage variation detector circuit 19. In other words, as far as the value of the input voltage variation rate falls in a predetermined range $a$ shown in FIG. 5, the particular deviation is not produced as a detection output. When the voltage difference between the rectifier 1 and the battery 2 is large, on the other hand, the input voltage variation rate of the inverter also increases and exceeds the predetermined range $a$ shown in FIG. 5, with the result that a detection output corresponding to the input voltage variation rate is produced. The predetermined range $a$ is usually determined symmetric with respective to the original point O, so that the upper and lower limits of the predetermined range are set at $+a/2$ and $-a/2$ respectively. This range, however, may be displaced unsymmetrically to positive or negative direction depending on the charateristics of the apparatus to which the inverter output is applied.

Figure 6:
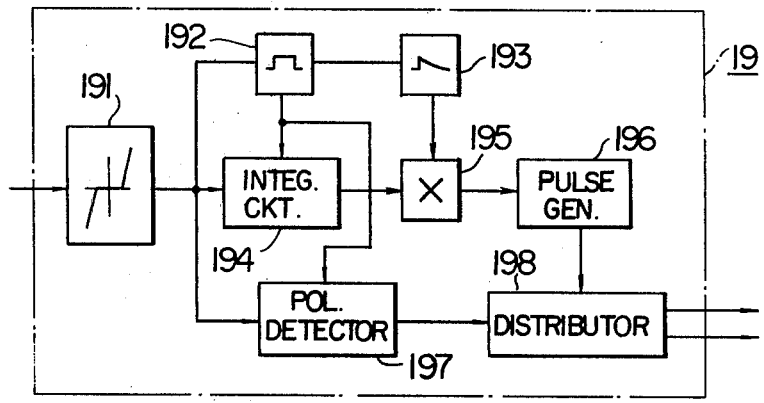
FIG. 6 is a block diagram showing a voltage-variation-detector circuit according to the embodiment of FIG. 4.

A block diagram of the voltage variation detector circuit 19 is shown in FIG. 6. The diagram of FIG. 7, on the other hand, shows waveforms produced at various parts of the voltage variation detector circuit 19.

Figure 5:
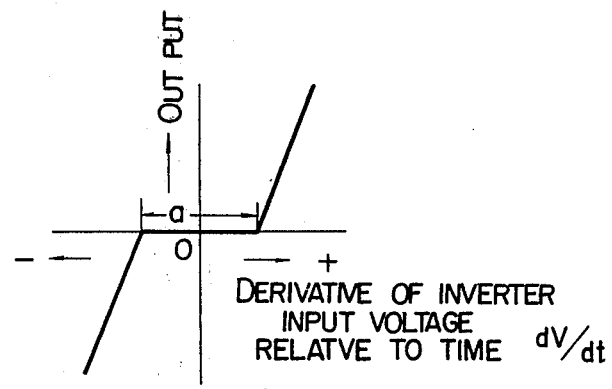
FIG. 5 shows detection characteristics of a detector shown in the embodiment of FIG. 4.
Figure 7:
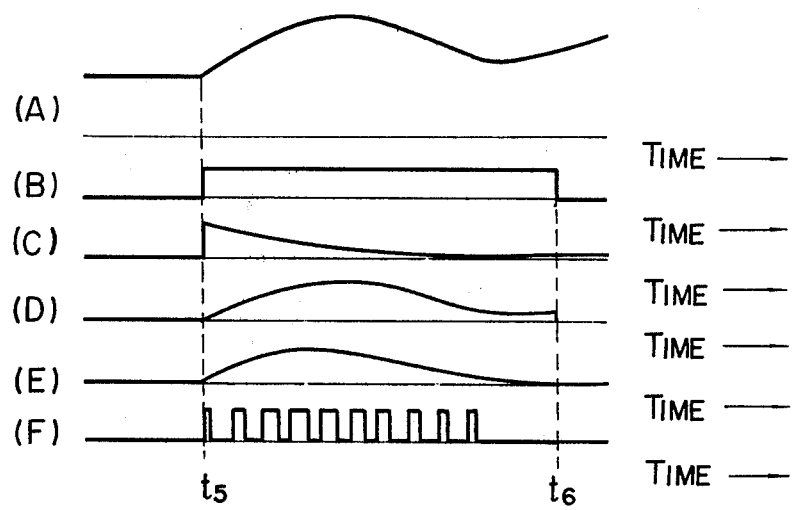
FIGS. 7 to 9 show waveforms produced at various parts of the embodiment of FIG. 4.

The input voltage of the inverter 4 (waveform (A) in FIG. 7) is detected by the voltage detector circuit 18, and when the instantaneous change thereof exceeds the predetermined range $a$, the detector section 191 produces an output in accordance with the input voltage variation rate $dv/dt$, as described in relation to FIG. 5. A time-setting section 192, in response to the production of the detection output from the detector section 191, produces an output signal (waveform (B) in FIG. 7) during a predetermined period from, for example, $t_5$ to $t_6$. During this period and in response to that output signal, a coefficient-producing section 193 produces an output signal representing a coefficient (waveform (C) in FIG. 7) determined by the inverter output voltage control characteristics of the voltage control circuit 12. An integrator section 194 is for integrating the output signal of the detector section 191 within the time set by the time-setting section 192, and the integrated signal (waveform (D) in FIG. 7) is applied to a multiplier section 195. The multiplier section 195 is provided for multiplying the output signal of the integrator section 194 by the output signal of the coefficient-producing section 193. The output signal of the multiplier section 195 (waveform (E) in FIG. 7) is applied to a pulse generator section 196 which in turn produces an output signal comprising a pulse train (waveform (F) in FIG. 7) including pulses each having a pulse width corresponding to the corresponding instantaneous amplitude of the output signal of the multiplier section 195 at a predetermined repetition rate. The pulse-producing section 196 included in this embodiment may preferably be so constructed as not to produce any output signal when the output signal of the multiplier section 195 is lower than a predetermined level, in view of the commutation of the inverter. A polarity detector section 197 is for detecting the polarity of a signal representing a voltage variation, produced from the detector section 191 so as to apply a signal representing the detection result to a distributor section 198. The distributor section 198 applies the output signal of the pulse-producing section 196 selectively to either one the signal distributor circuits 20 and 21 in accordance with the output signal from the polarity detector section 197. In other words, when the intput voltage of the inverter 4 increases so that the polarity of the rate $dv/dt$ is positive, the information relating to the detection of the positive polarity is supplied from the polarity detector section 197 to the distributor section 198, so that the signal distributor section 198 actuates only the signal distributor circuit 20. When the input voltage of the inverter 4 is reduced, by contrast, information relating to the detection of the negative polarity is supplied from the polarity detector section 197 to the distributor section 198, which actuates only the signal distributor circuit 21.

The operation of the signal distributor circuits 20 and 21 and the voltage variation detector circuit 19 will be described in further detail. For convenience of explanation, explanation will be made hereunder with reference to the unit converter shown in FIGS. 2 and 3.

Figure 8:
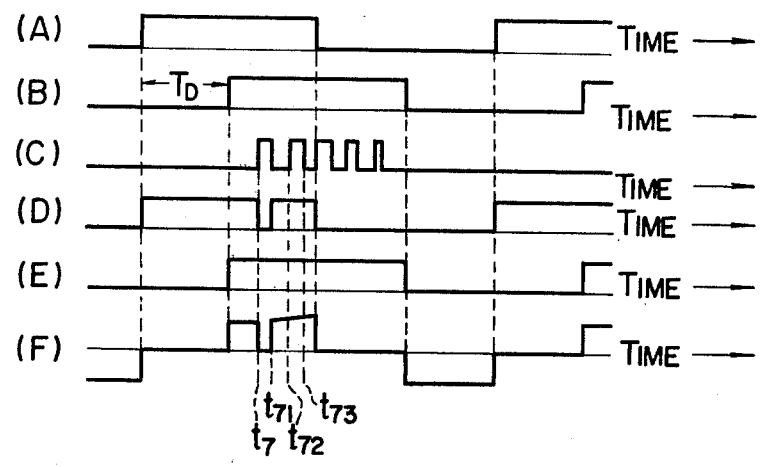

FIG. 8 shows waveforms (A), (B), (C), (D), (E) and (F) produced at various parts of the embodiment of FIG. 4 in the case where the input voltage of the inverter 4 increases.

The waveform (A) in FIG. 8 shows that of an output signal from the ring counter 14, and is used for firing the thyristor 41 of FIG. 2. The waveform (B) in FIG. 8 shows that of an output signal of the ring counter 15 whose phase is retarded by time $T_D$ established in the delay circuit 13 in accordance with the output signal of the voltage control circuit 12 than that of the output signal of the ring counter 14. This waveform (B) is used for firing the thyristor 44 shown in FIG. 2.

Under this condition, the voltage variation detector circuit 19 produces such a pulse train as shown in (C) of FIG. 8 (waveform (F) in FIG. 7). This pulse train is produced only through the signal distributor circuit 20 when the inverter input voltage increases, i.e., when the polarity of the detected input voltage variation rate is positive, so that a signal as shown by (D) in FIG. 8 is produced from the gate amplifier 16. This output signal is used as a firing or gating signal for the thyristor 41. As long as the signal distributor circuit 20 is in actuation, the signal distributor circuit 21 can not be actuated and the output signal of the ring counter 15 is applied directly to the gate amplifier 17, in whch it is converted into a signal with a waveform as shown by (E) of FIG. 8. This output signal of the gate amplifier 17 is used as a firing or gating signal for the thyristor 44. As a result, the voltage between the output terminals A and B of the unit inverter 4 comes to have a cut-in or be slotted in accordance with the input voltage variation of the inverter as shown by the waveform (F) of FIG. 8, i.e., a cut-in corresponding to the first pulse of the pulse train shown by waveform (C) of FIG. 8, during the period from $t_7$ to $t_{71}$, thereby preventing the output voltage of the inverter 4 from increasing. In other words, during the period from $t_7$ to $t_{71}$, the on-off condition of the thyristors 41 and 42 is temporarily reversed.

Next, during the period from $t_{72}$ to $t_{73}$, the voltage variation detector circuit 19 so operates as to cut in or slot the output voltage of the unit inverter of the next phase, corresponding to the second pulse of the pulse train. The voltage variation detector circuit 19 subsequently operates in such a manner as to form a slot of the output voltage of the following unit inverters in progressively delayed phases. It will be easily understood that the periods involved such as the periods from $t_7$ to $t_{71}$, $t_{72}$ to $t_{73}$, so on, are required to belong to a period during which the thyristors 41 and 44 of each of the unit inverters are to be conductive simultaneously.

The case where the input voltage of the inverter 4 is reduced will be explained below.

Figure 9:
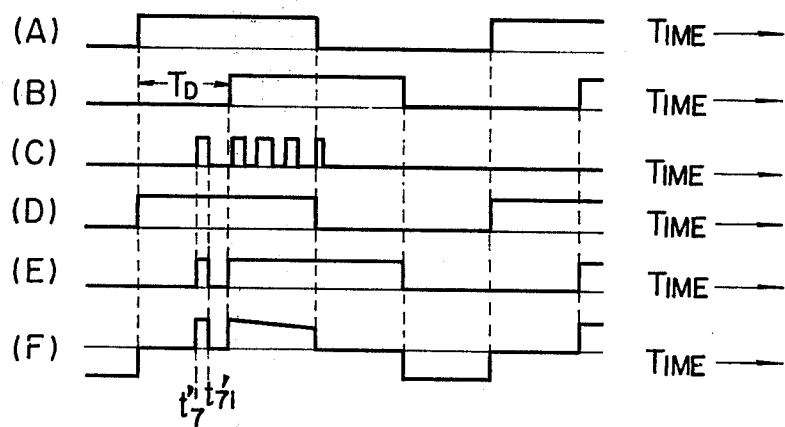

The waveforms (A), (B), (C), (D), (E) and (F) of FIG. 9 are those produced at various parts of the embodiment of FIG. 4 when the input voltage of the inverter is descreased.

The waveform (A) in FIG. 9 shows that of an output of the ring counter 14, and the waveform (B) thereof that of the ring counter 15. The waveforms (A) and (B) are used for firing the thyristors 41 and 44 shown in FIG. 2 respectively. The waveform (C) in FIG. 9 shows an output voltage of the voltage variation detector circuit 19. Under this condition, unlike the case where the inverter input voltage increases as mentioned above, the output of the voltage variation detector circuit 19 is produced only through the signal distributor circuit 21, and therefore, the gating signal of the thyristor 41 assumes the waveform as shown by (D) of FIG. 9, while a turned-on period $t_7'$ to $t_{71}'$ is added to the gating signal for the thyristor 44 as shown by the waveform (E) of FIG. 9, thereby increasing the turned-on period in accordance with the reduction in the input voltage of the inverter 4. In other words, the on-off conditions of the thyristors 43 and 44 are reversed during the period from $t_7'$ to $t_{71}'$. It will thus easily understood frm the drawing that the periods when the on-off condition of the thyristors 43 and 44 is reversed are required to belong to a period when the thyristor 41 is kept in an on-state while the thyristor 44 is kept in an off-state. The waveform (F) of FIG. 8 shows an output voltage produced between the output terminals A and B of the unit inverter.

As will be seen, when the input voltage of the inverter is decreasing, the gating signals for the thyristors 43 and 44 are changed to control the conduction period in such a manner as to produce an output voltage between the output terminals A and B of the unit inverter for an additional period corresponding to the reduction in the inverter input voltage, thus dampening the output voltage variations.

The conduction period corresponding to the pulse width of the second pulse of the pulse train is increased for the thyristor 44 of the unit inverter of the next phase. Similar procedures are repeated subsequently, thus dampening the output voltage variations of the inverter as a whole as in the case of the input voltage increase as described above.

The foregoing description refers to the case in which the inverter is controlled in such a manner that the phase of alternating waveforms appearing across the thyristor 44 of each of the respective unit inverters is retarded by the time $T_D$ as compared with that of the thyristor 41. The phase difference is not limited to such a case but may include the case in which the phase of the alternating waveform appearing across the thyristor 44 is delayed by the time $T_D$ behind that of the thyristor 42. In such a case, if the input voltage of the inverter is increased, it is enough to reverse the on-off conditions of the thyristor 43 and thyristor 44 only during the period corresponding to each associated pulse of the output pulse train produced from the pulse-producing section 196 of the input voltage variation detector circuit 19, during the period when the thyristor 42 of each unit inverter is in an on-state and the thyristor 44 is in an off-state. Further, when the input voltage decreases, it will be easily understood that it is enough to reverse the on-off conditions of the thyristors 41 and 42 only during the period corresponding to each associated pulse of the pulse train during the period when the thyristors 42 and 44 are in their on-states.

In the foregoing embodiments of the present invention, the output pulse train from the pulse-producing section 196 of the voltage variation detector circuit 19 has a predetermined repetition rate and each of the pulses of the pulse train has a pulse width proportional to the corresponding instantaneous amplitude of the output signal of the multiplier section 195. Notwithstanding, the pulses of the pulse train may have a fixed pulse width and a repetition rate proportional to the instantaneous amplitudes of the output signal of the multiplier section 195.

Furthermore, in the preceding embodiments, the pulses of the output pulse train of the voltate variation detector circuit 19 are distributed one by one among the respective unit inverters in accordance with the operating phases of the ring counters 14 and 15 for the purpose of regulation of the output voltage of the inverter. Alternatively, a plurality of pulses of the output pulse train of the voltage variation detector circuit 19 may be distributed to each unit inverter thereby to regulate the output voltage of the inverter.

As will be seen from the foregoing description that according to the present invention, the variations in the output voltage may be dampened in spite of the variations of the input voltage of the inverter, resulting in stable AC power.

I claim:

1. An inverter control apparatus comprising:
    first DC power supply means for rectifying an input AC power so as to produce a DC output;
    second DC power supply means including a battery and actuated to produce a DC output when said first DC power supply means is inoperative;
    a thyristor inverter device for converting the DC input power applied from the actuated one of said first and second DC power supply means into an AC output power;
    thyristor conduction control means for performing the on-off operation of the thyristors making up said inverter device, in a predetermined sequence;
    first control means for detecting the AC output voltage of said inverter device and for controlling the on-off operation of said thyristors performed by said thyristor conduction control means in accordance with the detected value of said AC output voltage, thereby regulating said AC output voltage at a given level;
    input voltage detector means for detecting the DC input voltage applied to said inverter device; and
    second control means responsive to said input voltage detector means for controlling the thyristor on-off operation performed by said thyristor conduction control means in accordance with the variations in said DC input voltage so as to dampen the variations in said AC output voltage attributable to the variations in said DC input voltage.

2. An inverter control apparatus according to claim 1, wherein said second control means is inoperative when the variations in said DC input voltage are within a predetermined range.

3. An inverter control apparatus comprising:
    first DC power supply means for rectifying an input AC power so as to produce a DC output;
    second DC power supply means including a battery and actuated to produce a DC output when said first DC power supply means is inoperative;
    a thyristor inverter device for converting the DC input power applied from the actuated one of said first and second DC power supply means into an AC output power;
    thyristor conduction control means for performing the on-off operation of the thyristors making up said inverter device, in a predetermined sequence;
    first control means for detecting the AC output voltage of said inverter device and for controlling the on-off operation of said thyristors performed by said thyristor conduction control means in accordance with the detected value of said AC output voltage, thereby regulating said AC output voltage at a given level;
    input voltage detector means for detecting the DC input voltage applied to said inverter device; and
    second control means responsive to said input voltage detector means for controlling the thyristor on-off operation performed by said thyristor conduction control means in accordance with the variations in said DC input voltage so as to dampen the variations in said AC output voltage attributable to the variations in said DC input voltage, said second control means including
    input voltage variation detector means responsive to said input voltage detector means for producing an output signal corresponding to the instantaneous change of said DC input voltage;
    time-setting means for producing an output signal maintained for a predetermined period of time in response to the output signal of said voltage variation detector means;
    coefficient-generating means for producing an output signal representing a coefficient determined by the output voltage control characteristics of said inverter device, in response to the output signal of said time-setting means;
    integrator means for integrating the output signal of said input voltage variation detector means so as to produce an output signal representing an integrated value during the period when the output signal of said time-setting means is maintained; and
    multiplier means for multiplying the output signal of said integrator means by the output signal of said coefficient-generating means so as to produce an output signal representing the resulting product, the conduction period of said thyristors making up said inverter device being controlled on the basis of the output signal of said multiplier means.

4. An inverter control apparatus according to claim 3, wherein said input voltage variation detector means is inoperative when said instantaneous change of said DC input voltage is within a predetermined range.

5. An inverter control apparatus according to claim 3, wherein said input voltage variation detector means produces said output signal when the absolute value of said instantaneous change of said DC input voltage exceeds a predetermined value.

6. An inverter control apparatus according to claim 4, wherein the upper limit of said predetermined range is a predetermined positive value and the lower limit thereof is a predetermined negative value.

7. An inverter control apparatus comprising:
first DC power supply means for rectifying an input AC power so as to produce a DC output;
second DC power supply means including a battery and actuated to produce a DC output when said first DC power supply means is inoperative;
a thyristor inverter device for converting the DC input power applied from the actuated one of said first and second DC power supply means into an AC output power;
thyristor conduction control means for performing the on-off operation of the thyristors making up said inverter device, in a predetermined sequence;
first control means for detecting the AC output voltage of said inverter device and for controlling the on-off operation of said thyristors performed by said thyristor conduction control means in accordance with the detected value of said AC output voltage, thereby regulating said AC output voltage at a given level;
input voltage detector means for detecting the DC input voltage applied to said inverter device; and
second control means responsive to said input voltage detector means for controlling the thyristor on-off operation performed by said thyristor conduction control means in accordance with the variations in said DC input voltage so as to dampen the variations in said AC output voltage attributable to the variations in said DC input voltage;
said inverter device including at least one unit inverter, a pair of input terminals across which said DC input power is supplied, and a pair of output terminals from which said AC output power is produced;
wherein said unit inverter includes a first set of first and second thyristors and a second set of third and fourth thyristors, said first and second thyristors being connected in series in the same polarity between said input terminals, said third and fourth thyristors being connected in series in the same polarity between said input terminals, a junction point of said first and second thyristors and a junction point of said third and fourth thyristors being connected to said output terminals respectively, said first and third thyristors being connected in series in opposite polarities between said output terminals; and
wherein said thyristor conduction control means cause said first and second thyristors of said first set to conduct alternately and alternatively on one hand, and cause said third and fourth thyristors of said second set to conduct alternately and alternatively on the other hand, the respective repetition rates of the on-off operations of said first and second sets being selected to be equal to each other; and
wherein the respective on-off operations of said first and second sets are controlled by said first control means in a manner so that the phase difference between the on-off operation of said first set of said first and second thyristors and the on-off operation of said second set of said third and fourth thyristors is controlled in accordance with the detected value of said AC output voltage; and
wherein the on-off operation of a selected one of said first and second sets is controlled by said second control means to change in accordance with the variation in said DC input voltage in response to said input voltage detector means.

8. An inverter control apparatus according to claim 7, wherein said input voltage detector means is inoperative when the variation in said DC input voltage is within a predetermined range.

9. An inverter control apparatus according to claim 7, wherein said second control means include:
input voltage variation detector means responsive to said input voltage detector means for producing an output signal corresponding to the instantaneous change of said DC input voltage;
time-setting means for producing an output signal maintained for a predetermined period of time in response to the output signal of said voltage variation detector means;
coefficient-generating means for producing an output signal representing a coefficient determined by the output voltage control characteristics of said inverter device, in response to the output signal of said time-setting means;
integrator means for integrating the output signal of said input voltage variation detector means so as to produce an output signal representing an integrated value during the period when the output signal of said time-setting means is maintained; and
multiplier means for multiplying the output signal of said integrator means by the output signal of said coefficient-generating means so as to produce an output signal representing the resulting product, the on-off operation of said selected one set of thyristors being changed on the basis of the output signal of said multiplier means.

10. An inverter control apparatus according to claim 9, wherein said input voltage variation detector means is inoperative when said instantaneous change is within a predetermined range.

11. An inverter control apparatus according to claim 9, wherein said input voltage variation detector means produce said output signal when the absolute value of said instantaneous change exceeds a predetermined value.

12. An inverter control apparatus according to claim 10, wherein the upper limit of said predetermined range is a predetermined positive value, and the lower limit thereof is a predetermined negative value.

13. An inverter control apparatus according to claim 9, wherein said inverter device includes a plurality of unit inverters so that the AC output power of said respective unit inverters are combined to derive an AC output power having a plurality of phases from said inverter device; and wherein said second control means further include pulse-producing means for producing a pulse train having a predetermined repetition rate and including a plurality of pulses each having a width corresponding to the amplitude of the output signal of said multiplier means produced at the time corresponding to said each pulse, whereby during the period corresponding to the pulse width of the first one of the plurality of pulses of said pulse train the on-off state of the thyristors of said selected one set of a first one of said plurality of unit inverters which produces an AC output component of a first one of said plurality of phases of said AC output power of said inverter device is reversed, and during the period corresponding to the pulse width of the second one of the plurality of pulses of said pulse train the on-off state of the thyristors of said selected one set of a second one of said plurality of unit inverters which produces an AC output component of a second one of said plurality of phases of said AC output power of said inverter device is reversed, said procedures being repeated subsequently.

14. An inverter control apparatus according to claim 13, wherein the alternate-alternative on-off operation of said first and second thyristors making up said each unit inverter and the alternate-alternative on-off operation of said third and fourth thyristors of said each unit inverter are controlled by said thyristor conduction control means in a manner so that the alternate voltage waveform appearing across said fourth thyristor is delayed behind the alternative waveform appearing across said first thyristor, by the phase difference determined in response to the output signal of said first control means within the range smaller than one half of the repetition period of the on-off operation of each of said thyristors; and wherein said second control means further include polarity detector means for detecting the polarity of said instantaneous change of said DC input voltage in response to the output signal of said input voltage variation detector means, in the case where the output signal of said polarity detector means indicates an increase in said DC input voltage, in the period during which the first and fourth thyristors of each of said unit inverters are simultaneously in an on-state, the on-off state of said first and second thyristors of said first one unit inverter being reversed during the period corresponding to the pulse width of said first one pulse in a manner so that the conduction period of said first thyristor of said first one unit inverter is slotted in correspondence to the pulse width of said first one pulse, the on-off state of said first and second thyristors of said second one unit inverter being reversed, similarly to said first one unit inverter, during the period corresponding to the pulse width of said second one pulse in a manner so that the conduction period of the first thyristor of said second one unit inverter is slotted in response to the pulse width of said second one pulse, said reversing operations being repeated subsequently; in the case where the output signal of said polarity detector means indicates a decrease in said DC input voltage, in the period during which the first thyristor of said each unit inverter is in an on-state and the fourth thyristor of the same is in an off-state, the on-off state of said third and fourth thyristors of said first one unit inverter being reversed during the period corresponding to the pulse width of said first one pulse in a manner so that a conduction period corresponding to the pulse width of said first one pulse is additionally provided in the off-period of said fourth thyristor of said first one unit inverter, the on-off state of said third and fourth thyristors of said second one unit inverter being reversed, similarly to said first one unit inverter, during the period corresponding to the pulse width of said second one pulse in a manner so that a conduction period corresponding to the pulse width of said second one pulse is additionally provided in the off-period of said fourth thyristor of said second one unit inverter, said reversing operations being repeated subsequently.

15. An inverter control apparatus according to claim 14, wherein said input voltage variation detector means is inoperative when said instantaneous change is within a predetermined range.

16. An inverter control apparatus according to claim 14, wherein said input voltage variation detector means produce said output signal when the absolute value of said instantaneous change exceeds a predetermined range.

17. An inverter control apparatus according to claim 14, wherein the upper limit of said predetermined range is a predetermined positive value, and the lower limit thereof is a predetermined negative value.

18. An inverter control apparatus according to claim 13, wherein the alternate-alternative on-off operation of said first and second thyristors making up said each unit inverter and the alternate-alternative on-off operation of said third and fourth thyristors of said each unit inverter are controlled by said thyristor conduction control means in a manner so that the alternate voltage waveform appearing across said fourth thyristor is delayed behind the alternate waveform appearing across said second thyristor, by the phase difference determined in response to the output signal of said first control means within the range smaller than one half of the repetition period of the on-off operation of each of said thyristors; and wherein said second control means further include polarity detector means for detecting the polarity of said instantaneous change in response to the output signal of said input voltage variation detector means, in the case where the output signal of said polarity detector means indicates a decrease in said DC input voltage, in the period during which the second and fourth thyristors of each of said unit inverters are simultaneously in an on-state, the on-off state of said first and second thyristors of said first one unit inverter being reversed during the period corresponding to the pulse width of said first one pulse in a manner so that the conduction period of said first thyristor of said first one unit inverter is slotted in correspondence to the pulse width of said first one pulse, the on-off state of said first and second thyristors of said second one unit inverter being reversed, similarly to said first one unit inverter, during the period corresponding to the pulse width of said second one pulse in a manner so that the conduction period of said first thyristor of said second one unit inverter is slotted in correspondence to the pulse width of said second one pulse, said reversing operations being repeated subsequently; in the case where the output signal of said polarity detector means indicates an increase in said DC input voltage, in the period during which the second thyristor of each of said unit inverters is in an on-state and the fourth thyristor of the same is in an off-state, the on-off state of said third and fourth thyristors being reversed during the period corresponding to the pulse width of said first one pulse in a manner so that a conduction period corresponding to the pulse width of said first one pulse is additionally provided in the off-period of said fourth thyristor of said first one unit inverter, the on-off state of said third and fourth thyristors of said second one unit inverter being reversed, similarly to said first one unit inverter, during the period corresponding to the pulse width of said second one pulse in a manner so that a conduction period corresponding to the pulse width of said second one pulse is additionally provided in the off-period of said fourth thyristor of said second one unit inverter, said reversing operations being repeated subsequently.

19. An inverter control apparatus according to claim 18, wherein said input voltage variation detector means is inoperative when said instantaneous change is within a predetermined range.

20. An inverter control apparatus according to claim 18, wherein said input voltage variation detector means produce said output signal when the absolute value of said instantaneous change exceeds a predetermined value.

21. An inverter control apparatus according to claim 18, wherein the upper limit of said predetermined range is a predetermined positive value, and the lower limit thereof is a predetermined negative value.

* * * * *